(12) United States Patent
Wu et al.

(10) Patent No.: US 12,525,839 B2
(45) Date of Patent: Jan. 13, 2026

(54) AXIAL FLUX MOTOR

(71) Applicant: NIDEC CORPORATION, Kyoto (JP)

(72) Inventors: Keng-Chang Wu, Taipei (TW); Guo-Jhih Yan, Taipei (TW); Hsiu-Ying Lin, Taipei (TW); Kuo-Min Wang, Taipei (TW)

(73) Assignee: NIDEC CORPORATION, Kyoto (JP)

( * ) Notice: Subject to any disclaimer, the term of this patent is extended or adjusted under 35 U.S.C. 154(b) by 219 days.

(21) Appl. No.: 18/456,525

(22) Filed: Aug. 28, 2023

(65) Prior Publication Data

US 2024/0097520 A1 Mar. 21, 2024

(30) Foreign Application Priority Data

Sep. 20, 2022 (CN) .......................... 202211148088.2

(51) Int. Cl.
*H02K 3/52* (2006.01)
*H02K 21/24* (2006.01)

(52) U.S. Cl.
CPC ............. *H02K 3/522* (2013.01); *H02K 21/24* (2013.01); *H02K 2203/12* (2013.01)

(58) Field of Classification Search
CPC ........ H02K 21/24; H02K 3/522; H02K 1/182; H02K 2203/12; H02K 1/2713; H02K 1/2726; H02K 1/2788
See application file for complete search history.

(56) References Cited

U.S. PATENT DOCUMENTS

| 2012/0126653 | A1* | 5/2012 | Yang ..................... | H02K 1/146 |
| | | | | 310/156.32 |
| 2015/0001979 | A1 | 1/2015 | Deguchi et al. | |
| 2019/0252930 | A1* | 8/2019 | Stetina ................... | H02K 3/522 |
| 2020/0373817 | A1* | 11/2020 | Yan ...................... | H02K 11/215 |

FOREIGN PATENT DOCUMENTS

| JP | 2006288012 A | 10/2006 |
| JP | 2010246171 A | 10/2010 |
| JP | 2016178833 A | 10/2016 |
| KR | 1020150143152 A | 12/2015 |

* cited by examiner

*Primary Examiner* — Christopher M Koehler
*Assistant Examiner* — Riley Owen Stout
(74) *Attorney, Agent, or Firm* — HAUPTMAN HAM, LLP

(57) ABSTRACT

An axial flux motor includes a rotor assembly and a stator assembly. The rotor assembly has magnets. The stator assembly has a circuit substrate, segmented iron cores, and a coil. The circuit substrate extends radially. The segmented iron cores are supported on the circuit substrate to be opposite to the magnet in the axial direction. Segmented iron cores arranged in the circumferential direction. A coil is sleeved on a segmented iron core. Holding seats of an insulating material correspond respectively to the segmented iron cores. A holding seat abuts with and covers a segmented iron core from both axial sides and the circumferential direction, and is used for winding the coil. The circuit substrate has slot holes. A slot hole is used for embedding and positioning a portion of a holding seat that protrudes more towards one axial side than the coil.

9 Claims, 9 Drawing Sheets

AXIAL FLUX MOTOR

CROSS-REFERENCE TO RELATED APPLICATIONS

The present invention claims priority under 35 U.S.C. § 119 to Chinese Patent Application No. 202211148088.2 filed on Sep. 20, 2022, the entire content of which is incorporated herein by reference.

TECHNICAL FIELD

The present invention relates to an axial flux motor.

BACKGROUND

In the past, there was an axial flux motor having a rotor assembly and a stator assembly. The rotor assembly includes magnets, and the stator assembly includes a circuit substrate, segmented iron cores, and coils. The circuit substrate extends radially, and the segmented iron cores are supported on the circuit substrate in a manner to be opposite to the magnets in an axial direction, and there are a plurality of segmented iron cores arranged in the circumferential direction, and a coil is sleeved on a segmented iron core (refer to Patent Document 1).

Patent Document 1: International Publication WO2019/107074

In the axial flux motor mentioned above, an axial end of a segmented iron core protrudes more towards one axial side than a coil sleeved on the iron core, there are slot holes on the circuit substrate that match the axial ends of the segmented iron cores, thus, by embedding an axial end of the segmented iron core into a slot hole on the circuit substrate, the segmented iron core can be positioned radially and circumferentially relative to the circuit substrate, which helps to restrain the deviation of performance and cogging torque of mass manufactured motors.

However, in practice, sometimes it is necessary to form an axial size of the iron core to be less than an axial size of the coil, and in this case, this can be problem how to conveniently position the segmented iron cores relative to the circuit substrate to suppress the deviation of motor performance and cogging torque.

SUMMARY

The invention is derived in view of the above problem, and aims to provide an axial flux motor, which can conveniently position the segmented iron cores relative to the circuit substrate, so as to restrain the deviation of motor performance and cogging torque, even if the axial size of the segmented iron core is smaller than the axial size of the coil.

In order to achieve the above object, the present invention provides an axial flux motor comprising a rotor assembly and a stator assembly, the rotor assembly has a magnet, the stator assembly has a circuit substrate, segmented iron cores, and coils, the circuit substrate extends radially, the segmented iron cores are supported on the circuit substrate in a manner to be opposite to the magnet in the axial direction, and there are the plurality of segmented iron cores arranged in a circumferential direction, a coil is sleeved on a segmented iron core, wherein there are a plurality of holding seats made of an insulating material corresponding respectively to the plurality of segmented iron cores, a holding seat abuts with and covers a segmented iron core from both axial sides and the circumferential direction, and is used for winding the coil, the circuit substrate has a slot hole, which is used for embedding and positioning the portion of the holding seat that protrudes more towards one axial side than the coil.

The axial flux motor according to the present invention has the plurality of holding seats corresponding respectively to the plurality of segmented iron cores, the holding seat abuts with and covers the segmented iron core from both side of the axial direction and the circumferential direction, and is used for winding the coil, the circuit substrate has slot holes, each of which is used for embedding and positioning the portion of the holding seats that protrudes more towards the one axial side than the coil, and thereby, even if the axial size of the segmented iron core is less than the axial size of the coil, it can also conveniently position the segmented iron core relative to the circuit substrate by means of the holding seat, so as to restrain the deviation of the motor performance and the cogging torque and improve the productivity; moreover, the holding seats are made of the insulating material, so it can easily ensure that the segmented iron core and coil are insulated from each other.

In addition, in the axial flux motor of the present invention, it is preferred that a peripheral edge of the slot hole abuts with the holding seat from one side in the axial direction, and the inner wall surface of the slot hole abuts with the holding seat in the radial and circumferential directions, respectively.

According to the axial flux motor of the invention, the peripheral edge of the slot hole abuts with the holding seat from the one side in the axial direction, and the inner wall surface of the slot hole abuts with the holding seat in the radial and circumferential directions, respectively, and thereby, it facilitates the improvement of the positioning accuracy of the segmented iron cores relative to the circuit substrate by means of the holding seats, so as to further inhibit the deviation of the motor performance and cogging torque.

In addition, in the axial flux motor of the present invention, it is preferred that the holding seat has a accommodating chamber, which allows for the insertion of the segmented iron core from a radially outer side to a radially inner side.

According to the axial flux motor of the present invention, the holding seat has the accommodating chamber, which allows for the insertion of the segmented iron core from the radially outer side to the radially inner side, and thereby, the segmented iron core can be conveniently assembled in the holding seat, thereby improving assembly efficiency and reducing assembly costs.

In addition, in the axial flux motor of the present invention, it is preferred that the holding seat has an abutting portion that abuts with the segmented iron core from the radially inner side.

According to the axial flux motor of the present invention, the holding seat has an abutting portion that abuts with the segmented iron core from the radially inner side, and thereby, when inserting the segmented iron core into the holding seat, it can conveniently achieve the radial positioning of the segmented iron core relative to the holding seat.

In addition, in the axial flux motor of the present invention, it is preferred that the holding seat has an elastic snap-fit that abuts with the segmented iron core from the radially outer side.

According to the axial flux motor of the present invention, the holding seat has an elastic snap-fit that abuts with the segmented iron core from the radially outer side, and thereby, after inserting the segmented iron core into the holding seat, it can prevent the segmented iron core from disengaging from the holding seat, thereby improving assembly efficiency and reducing assembly costs.

In addition, in the axial flux motor of the present invention, it is preferred that the holding seat has a bottom plate, a top plate, and side plates that surround to form the accommodating chamber, the bottom plate abuts with and covers the segmented iron core from the one side in the axial direction and abuts with the circuit substrate from the other side in the axial direction, the top plate abuts with and covers the segmented iron core from the other side in the axial direction, and the side plates connect the top plate with the bottom plate, and abut with the segmented iron core from both sides in the circumferential direction.

According to the axial flux motor of the present invention, the holding seat has a bottom plate, a top plate, and side plates that surround to form the accommodating chamber, the bottom plate abuts with and covers the segmented iron core from the one side in the axial direction, and abuts with the circuit substrate from the other side in the axial direction, the top plate abuts with and covers the segmented iron core from the other side in the axial direction, and the side plates connect the top plate with the bottom plate, and abut with the segmented iron core from the both sides in the circumferential direction. Therefore, it is helpful to further improve the positioning accuracy of the segmented iron cores relative to the circuit substrate by means of the holding seats, so as to further restrain the deviation of motor performance and cogging torque.

In addition, in the axial flux motor of the present invention, it is preferred that the top plate and/or the bottom plate is provided with an abutting portion that abuts with the segmented iron core from the radially inner side.

According to the axial flux motor of the present invention, the top plate and/or bottom plate is provided with the abutting portion that abuts with the segmented iron core from the radially inner side, and thereby, when inserting the segmented iron core into the holding seat, it can conveniently achieve the radial positioning of the segmented iron core relative to the holding seat.

In addition, in the axial flux motor of the present invention, it is preferred that the holding seat has a boss portion that protrudes from the bottom plate and is embedded into the slot hole, and the portion of the bottom plate connected to the boss portion abuts with the peripheral edge of the slot hole from the other side in the axial direction.

In addition, in the axial flux motor of the present invention, it is preferred that the inner wall surface of the slot hole is provided with a first engaging portion and a second engaging portion opposite to the first engaging portion in a first direction, the portion of the holding seat embedded into the slot hole has a first engaged portion that engages with the first engaging portion and a second engaged portion that engages with the second engaging portion.

In addition, in the axial flux motor of the present invention, it is preferred that, in a second direction perpendicular to the first direction, a gap is formed between a portion of the holding seat embedded into the slot hole and the inner wall surface of the slot hole.

According to the axial flux motor of the present invention, a first engaging portion and a second engaging portion opposite to the first engaging portion in the first direction are provided on the inner wall surface of the slot hole, and the portion of the holding seat embedded into the slot hole has a first engaged portion that engages with the first engaging portion and a second engaged portion that engages with the second engaging portion, in a second direction perpendicular to the first direction, a gap is formed between the portion of the holding seat embedded into slot hole and the inner wall surface of the slot hole, and thereby, while utilizing the engaging portions and the engaged portions to achieve the positioning of the holding seat relative to the circuit substrate, the gap between the portion of the holding seat embedded into the slot hole and the inner wall surface of the slot hole can be used to conveniently embed the holding seat into the circuit substrate.

Invention Effects

According to the present invention, there are the plurality of holding seats corresponding respectively to the plurality of segmented iron cores, a holding seat abuts with and covers a segmented iron core from both axial sides and the circumferential direction, and is used for winding the coil, the circuit substrate has slot holes, a slot hole is used for embedding and positioning the portion of a holding seat that protrudes more towards one axial side than the coil, and thereby, even if the axial size of the segmented iron core is smaller than the axial size of the coil, it can also conveniently position the segmented iron core relative to the circuit substrate by means of the holding seats, so as to restrain the deviation of the motor performance and the cogging torque and improve the productivity; moreover, the holding seats are made of the insulating material, so it can easily ensure that the segmented iron core and coil are insulated from each other.

DESCRIPTION OF THE EMBODIMENTS

Figure 1:
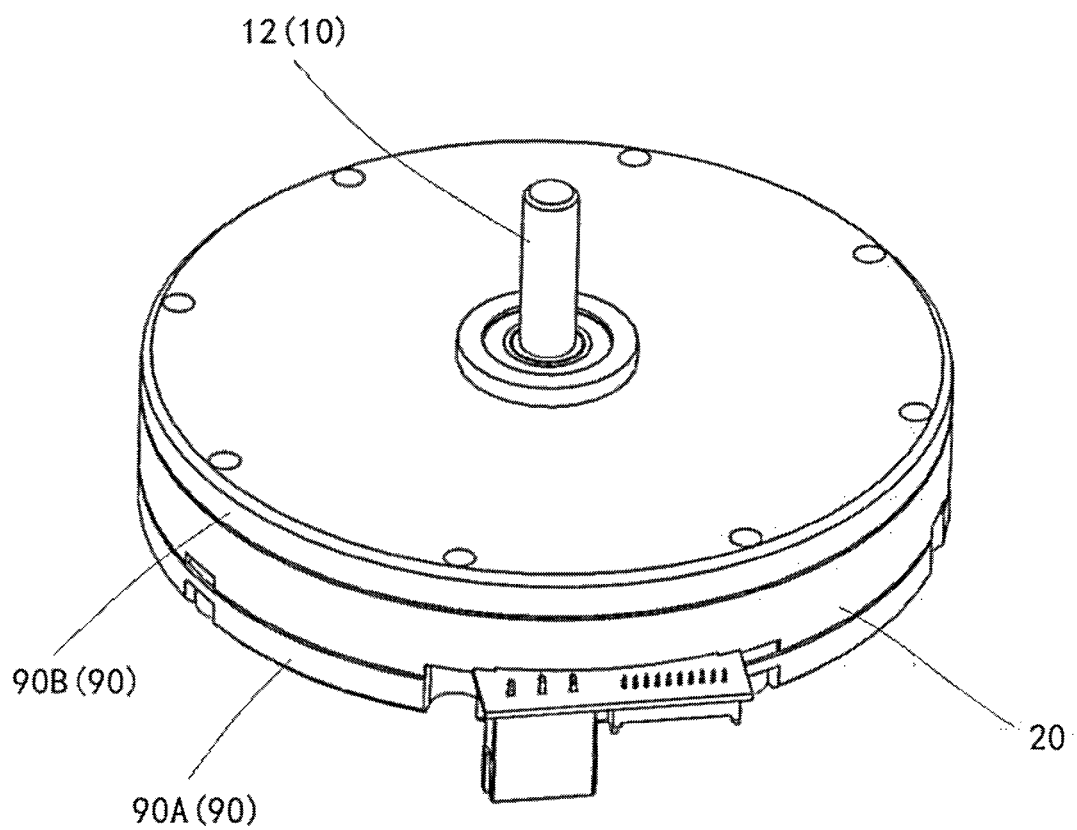
FIG. 1 is a perspective view schematically illustrating an axial flux motor according to an embodiment of the present invention.

Hereinafter, the axial flux motor of the embodiment of the present invention will be explained with reference to FIGS. 1 to 9.

Here, it should be noted that in the description, "axial direction" refers to a direction in that the rotation axis of the rotor assembly relative to a rotation axis of the stator assembly extends, "radial direction" refers to a radial direction that is centered on the rotation axis of the rotor assembly relative to the stator assembly, and "circumferential direction" refers to a circumferential direction that is centered on the rotation axis of the rotor assembly relative to the stator assembly.

In addition, for the convenience of explanation, the rotation axis of the rotor assembly relative to the stator assembly is referred as L, one side in the axial direction is referred as L1, and the other side in the axial direction is referred as L2.

(Overall Structure of the Axial Flux Motor)

As shown in FIGS. 1 to 6, the axial flux motor 1 includes a rotor assembly and a stator assembly 20, the rotor assembly 10 includes a magnet 112, the stator assembly 20 includes a circuit substrate 21, segmented iron cores 22, and coils 23. The circuit substrate 21 extends radially, and the segmented iron cores 22 are supported on the circuit substrate 21 in a manner to be opposite to the magnet 112 in the axial direction, and there are a plurality of segmented iron cores arranged in the circumferential direction. A coil 23 is sleeved on a segmented iron core 22.

Figure 2:
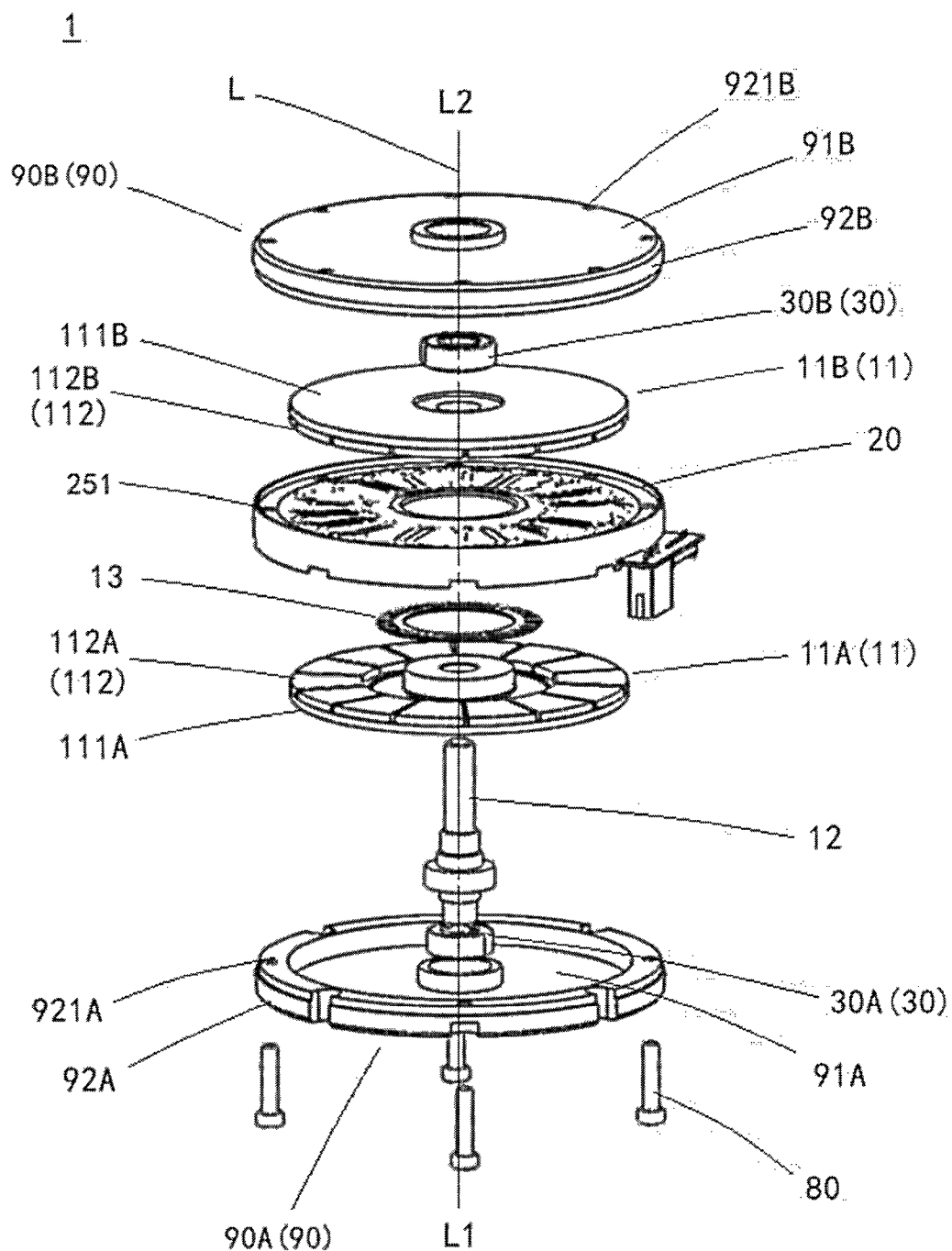
FIG. 2 is an exploded view schematically illustrating the axial flux motor according to the embodiment of the present invention.

Here, as shown in FIGS. 1 and 2, the axial flux motor 1 further has cover bodies 90, which are assembled on the stator assembly 20 from both sides in the axial direction, thereby forming together with the stator assembly 20 a space for accommodating a body of the rotor assembly 10, and the rotor assembly 10 is supported on the cover bodies 90 in a rotatable manner by means of the bearings 30.

(Structure of the Rotor Assembly)

As shown in FIG. 2, the rotor assembly 10 includes the rotors 11 and the spindle 12.

Here, as shown in FIG. 2, the rotors 11 include a first rotor 11A and a second rotor 11B, and the spindle 12 passes through the first rotor 11A, the stator assembly 20, and the second rotor 11B in the axial direction, and is fixed to the first rotor 11A and the second rotor 11B.

Further, as shown in FIG. 2, the first rotor 11A is located at the one side L1 of the stator assembly 20 in the axial direction, and has a first magnet retainer 111A and first magnets 112A constituting the magnet 112. The first magnet retainer 111A is in the form of a plate shape that extends radially (in the example shown, in the form of a circular plate centered on the rotation axis L), and is composed of a magnetic body, for example. The first magnets 112A are provided on a surface of the first magnet retainer 111A at the other side L2 in the axial direction in a manner to be spaced from and being opposite to the stator assembly 20 at the one side L1 in the axial direction, and there are a plurality of first magnets arranged in the circumferential direction.

Further, as shown in FIG. 2, the second rotor 11B is located at the other side L2 of the stator assembly 20 in the axial direction, and has a second magnet retainer 111B and second magnets 112B constituting the magnet 112. The second magnet retainer 111B is in the form of a plate shape that extends radially (in the example shown, in the form of a circular plate centered on the rotation axis L), and, for example, is composed of a magnetic body. The second magnets 112B are provided on a surface of the second magnet retainer 111B at the one side L1 in the axial direction in a manner to be spaced from and be opposite to the stator assembly 20 at the other side L2 in the axial direction, and there are a plurality of second magnets arranged in the circumferential direction.

Further, as shown in FIG. 2, the spindle 12 passes through the first magnet retainer 111A, the circuit substrate 21, and the second magnet retainer 111B in the axial direction, and is fixed to the first magnet retainer 111A and the second magnet retainer 111B. The end of the spindle 12 at the one side L1 in the axial direction is rotatably supported on the cover body 90 by means of the first bearing 30A (such as composed of ball bearings) included by the bearing 30, and the end of the spindle 12 at the other side L2 in the axial direction is rotatably supported on the cover body 90 by means of the second bearing 30B (such as composed of ball bearings) included by the bearing 30.

Further, as shown in FIG. 2, the rotor assembly 10 further includes an encoding disc 13, which is in a circular shape (in the example shown in the Figures, it is in the circular shape centered on the rotation axis L), located on the surface of the first magnet retainer 111A of the first rotor 11A at the other side L2 in the axial direction, and is surrounded by the first magnets 112A arranged in the circumferential direction.

(Structure of the Stator Assembly)

As mentioned above, the stator assembly 20 has a circuit substrate 21, segmented iron cores 22 and coils 23.

Here, as shown in FIGS. 3 to 6, the stator assembly 20 further has a plurality of holding seats 24 made of an insulating material and corresponding respectively to the plurality of segmented iron cores 22, a holding seat 24 abuts with and covers a segmented iron core 22 from both axial sides and the circumferential direction, and is used for winding a coil 23, the circuit substrate 21 has slot holes 211, one of which is used for embedding and positioning a portion of a holding seat 24 that protrudes more towards the one axial side L1 than the coil 23.

Figure 4:
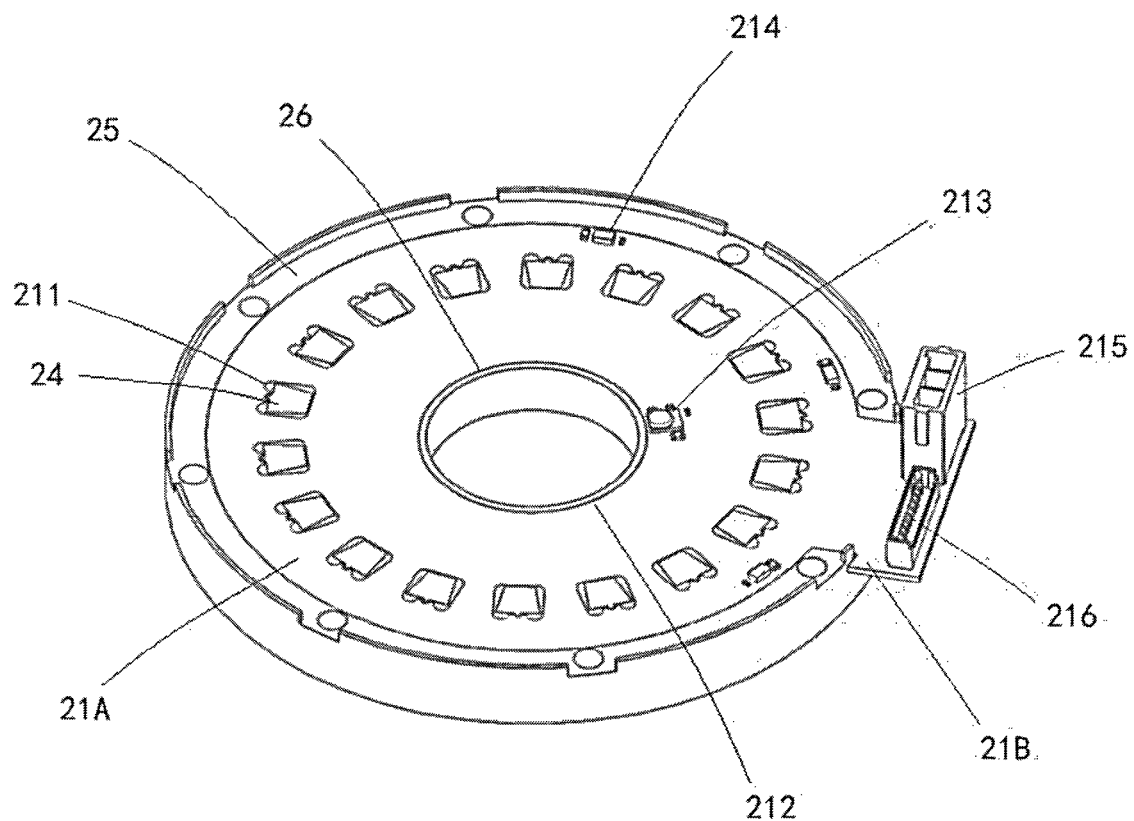
FIG. 4 is a perspective view schematically illustrating the stator assembly in the axial flux motor according to the embodiment of the present invention, and represents a state observed from one side in the axial direction.
Figure 6:
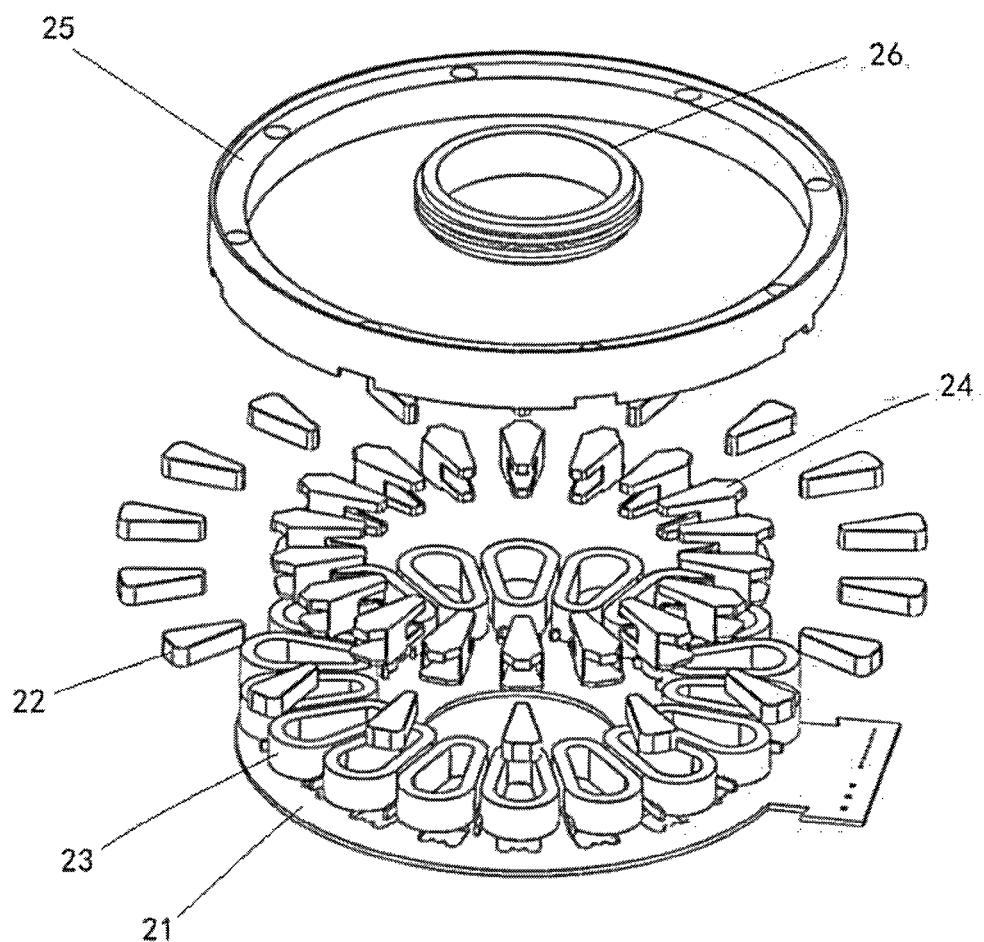
FIG. 6 is an exploded view schematically illustrating the stator assembly in the axial flux motor according to the embodiment of the present invention.
Figure 7:
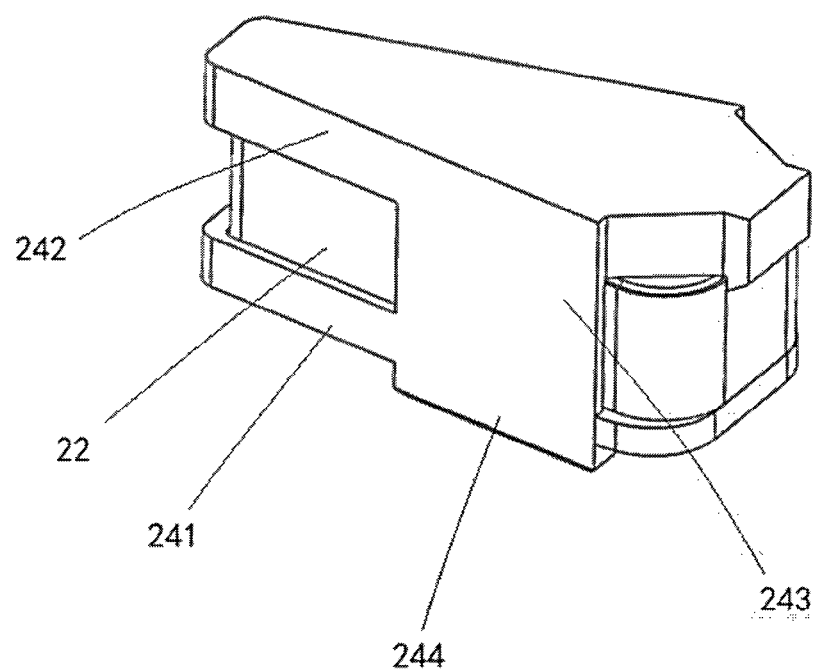
FIG. 7 is a perspective view schematically illustrating a holding seat and a segmented iron core in the axial flux motor according to the embodiment of the present invention, and represents the state observed from the other side in the axial direction.

In addition, as shown in FIGS. 4 and 6, the circuit substrate 21 has a main body 21A and a protrusion 21B. The main body 21A is in the form of circular shape with through holes 212 that pass axially (in the example shown in the Figures, it is in the form of circular shape centered on the rotation axis L), the slot holes 211 are arranged circumferentially on the main body 21A centered on the rotation axis L, and the protrusion 21B protrudes radially outwards from a position on the outer peripheral edge of the main body 21A in the circumferential direction.

In addition, as shown in FIG. 4, a first detection element 213 and a second detection element 214 are also provided on the circuit substrate 21. Specifically, the first detection element 213 is provided on the surface of the circuit substrate 21 at the one side L1 in the axial direction, and is provided on the peripheral edge of the through hole 212 in a manner to be opposite to the encoding disk 13 in the axial direction. The first detection element 213, for example, is composed of a magnetic sensing element and can cooperate with the encoding disc 13 to detect a rotation angle of the rotor assembly 10. The second detection element 214 is provided on the surface of the circuit substrate 21 at the one side L1 in the axial direction, and is provided on the outer peripheral edge of the circuit substrate 21 in a manner to be opposite to the first magnet 112A in the axial direction. The second detection element 214, for example, is composed of a magnetic sensing element and can detect the position of the first magnets 112A. Moreover, the first detection element 213 and the second detection element 214 can be one or more.

Figure 5:
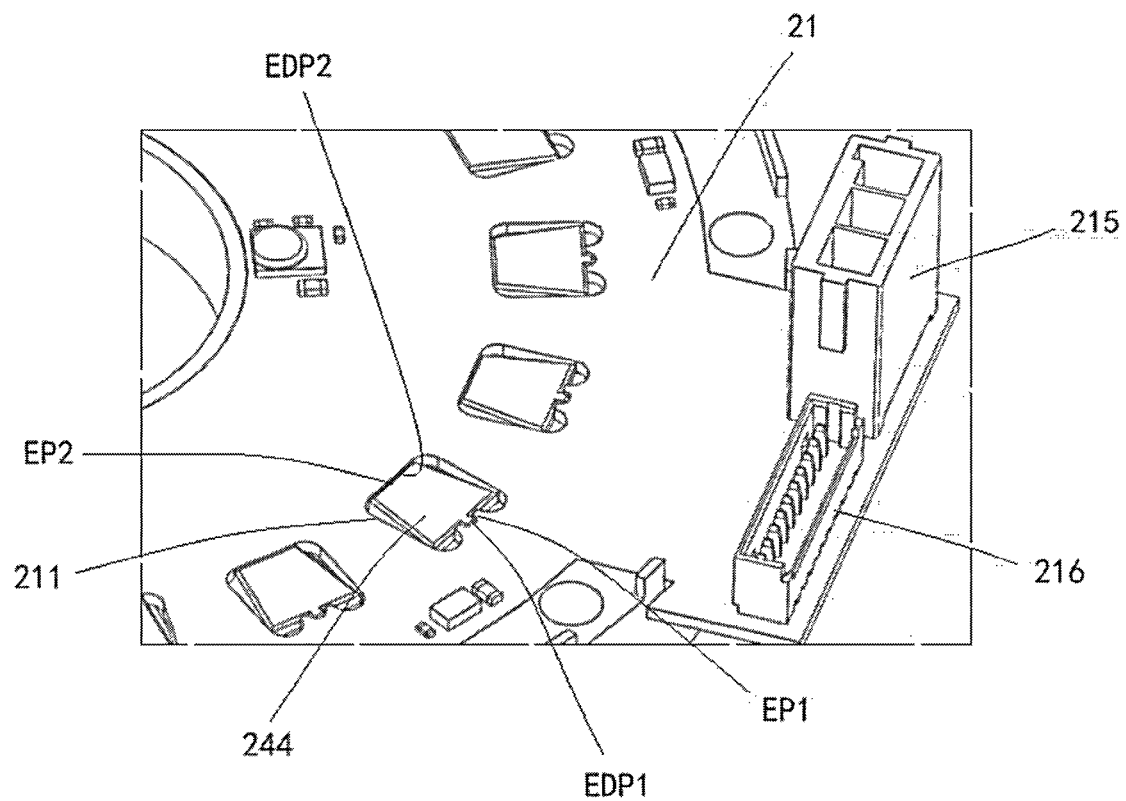
FIG. 5 is a partial perspective view schematically illustrating the stator assembly in the axial flux motor according to the embodiment of the present invention.

In addition, as shown in FIGS. 4 and 5, a first connector 215 and a second connector 216 are also provided on the circuit substrate 21. Specifically, the first connector 215 and the second connector 216 are provided on a surface of the protrusion 21B of the circuit substrate 21 at the one side L1 in the axial direction, and are arranged in the circumferential direction. The first connector 215 is used for connecting to an external power source, and the second connector 216 is used for communicating with external (for example, sending detection results from the first detection element 213 and the second detection element 214 to the external).

Figure 9:
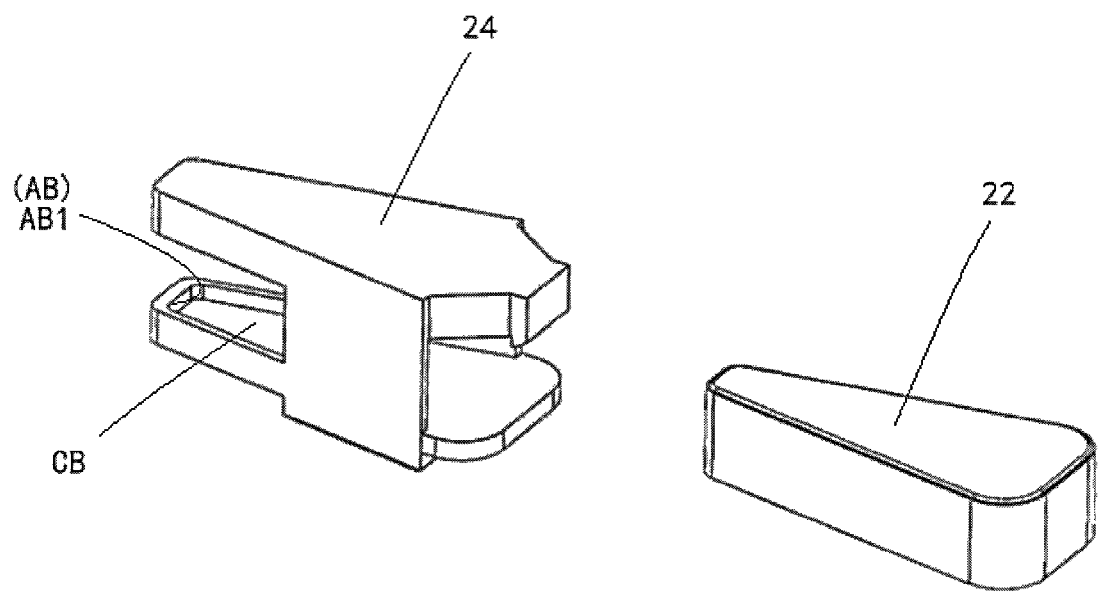
FIG. 9 is an exploded view schematically illustrating the holding seat and the segmented iron core in the axial flux motor according to the embodiment of the present invention.

In addition, as shown in FIGS. 6 and 9, when viewed along the axial direction, the segmented iron core 22 has an appropriate trapezoidal shape with a less circumferential width as it is closer to the radial inner side. The segmented iron cores 22 are supported on the circuit substrate 21 in an equally spaced arrangement manner in the circumferential direction.

Figure 3:
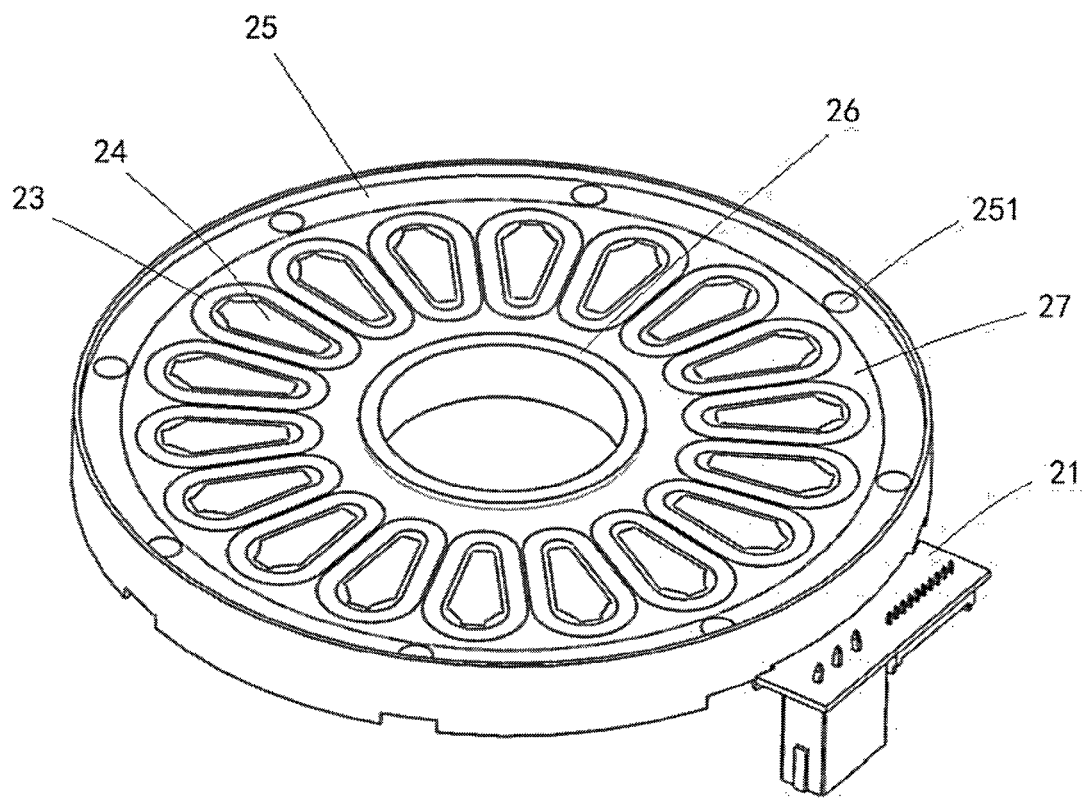
FIG. 3 is a perspective view schematically illustrating the stator assembly in the axial flux motor according to the embodiment of the present invention, and represents the state observed from another side in the axial direction.

In addition, the coils 23 are electrically connected to the circuit substrate 21. As shown in FIGS. 3 and 6, when viewed axially, the coil 23 is in the form of a cylindrical shape surrounding the segmented iron core 22 (specifically the holding seat 24). When observed along the axial direction, the outer profile of the coil 23 has an appropriate trapezoidal shape with a less circumferential width as it is closer to the radial inner side.

In addition, the holding seat 24 is, for example, integrally formed by a resin. As shown in FIGS. 6 to 9, the holding seat 24 has a accommodating chamber CB for inserting the segmented iron core 22 from the radially outer side to the radially inner side. The holding seat 24 has an abutting portion AB that abuts with the segmented iron core 22 from the radially inner side, and an elastic snap-fit SF that abuts with the segmented iron core 22 from the radially outer side. Specifically, the holding seat 24 has a bottom plate 241, a top plate 242, and side plates 243 that surround to form the accommodating chamber CB, the bottom plate 241 abuts with and covers the segmented iron core 22 from the one side L1 in the axial direction, and abuts with the circuit substrate 21 from the other side L2 in the axial direction, the top plate 242 abuts with and covers the segmented iron core 22 from the other side L2 in the axial direction, and the side plates 243 connect the bottom plate 241 with the top plate 242, and abut with the segmented iron core 22 from both sides in the circumferential direction, and cover portions of the side surfaces of the segmented iron core 22 at both sides in the circumferential direction. Moreover, the bottom plate 241 is provided with a first abutting portion AB1 constituting the abutting portion AB that abuts with the segmented iron core 22 from the radially inner side (in the example shown in the Figures, it is composed of a protrusion protruding from an end of the bottom plate 241 at the radially inner side towards the other side L2 in the axial direction), the top plate 242 is provided with a second abutting portion AB2 constituting the abutting portion AB that abuts with the segmented iron core 22 from the radially inner side (in the example shown in the Figures, it is composed of a protrusion protruding from the end of the top plate 242 at the radially inner side towards one axial side L1), and an elastic snap-fit SF that abuts with the segmented iron core 22 from the radially outer side (in the example shown in the Figures, it is composed of a protrusion protruding from the end of the top plate 242 at the radially outer side towards one axial side L1), the side plates 243 connect radial-middle sections of the bottom plate 241 at both circumferential sides with radial-middle sections of the top plate 242 at both circumferential sides. Moreover, the holding seat 24 has a boss portion 244 that protrudes from the bottom plate 241 and is embedded into the slot hole 211 of the circuit substrate 21. Moreover, when observed along the axial direction, the accommodating chamber CB of the holding seat 24 also has an appropriate trapezoidal shape with a less circumferential width as it is closer to the radial inner side.

Figure 8:
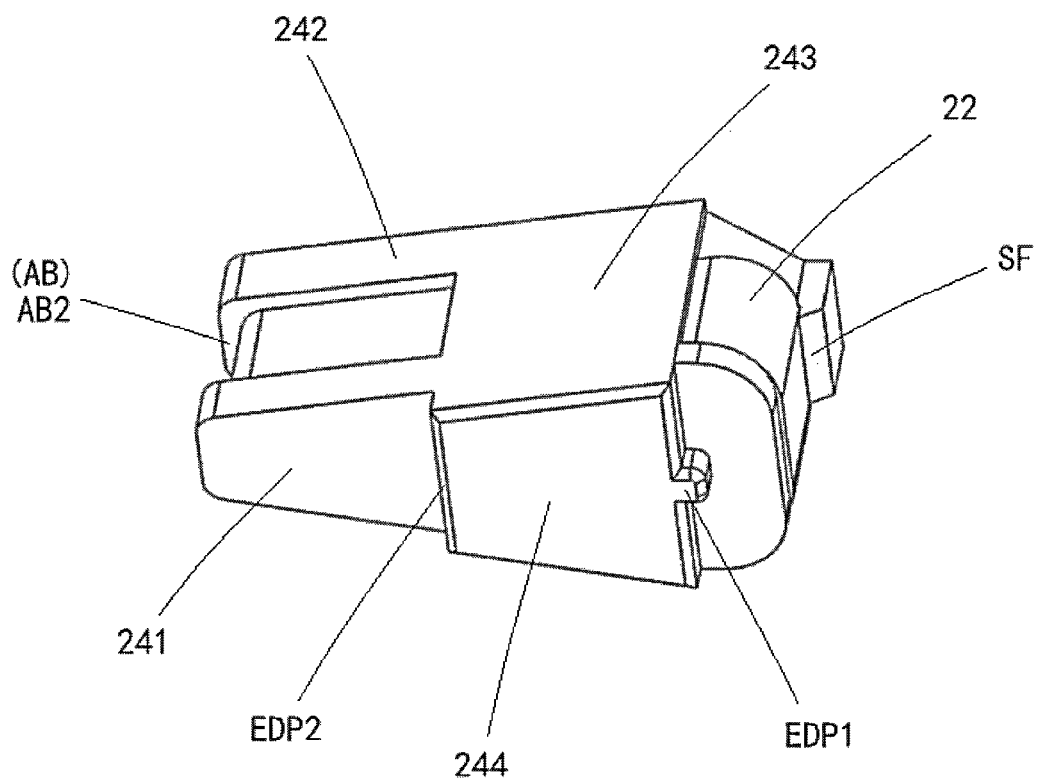
FIG. 8 is a perspective view schematically illustrating the holding seat and the segmented iron core in the axial flux motor according to the embodiment of the present invention, and represents the state observed from the one side in the axial direction.

In addition, according to FIGS. 5 and 6, it can be seen that a peripheral edge of the slot hole 211 on the circuit substrate 21 abuts with the holding seat 24 from the one side L1 in the axial direction, and the inner wall surface of slot hole 211 abuts with the holding seat 24 in both the radial and circumferential directions, respectively. Specifically, as shown in FIGS. 5, 6, and 8, the portion of the bottom plate 241 of the holding seat 24 that connects with the boss portion 244 abuts with the peripheral edge of the slot hole 211 of the circuit bottom plate 21 from the other side L2 in an axial direction. Moreover, there is a first engaging portion EP1 on the inner wall surface of the slot hole 211 on the circuit substrate 21 (in the example shown, it is composed of a groove that is recessed towards the outer side from the inner wall surface of the side slot hole 211 at the radial outer side) and a second engaging portion EP2 (in the example shown, it is composed of an inner wall surface located at the radially inner side of the slot hole 211 and perpendicular to the radial direction) and is opposite to the first engaging portion EP1 in the first direction (consistent with the radial direction in the example shown), the portion (in the example shown, it is the boss portion 244) of the holding seat 24 embedded into the slot hole 211 has a first engaged portion EDP1 (in the example shown, it is composed of a protrusion protruding from the radially outside end face of the boss portion 244 towards the radially outer side) that engages with the first engaging portion EP1 and a second engaged portion EDP2 (in the example shown, it is composed of an end face of the boss portion 244 at the radially inside and perpendicular to the radial direction) that engages with the second engaging portion EP2. In the second direction perpendicular to the first direction (in the example shown, the circumferential direction), there is a gap formed between the portion (in the example shown, the boss portion 244) of the holding seat 24 embedded into the slot hole 211 and the inner wall surface of the slot hole 211 of the circuit substrate 21 (in the example shown in the Figures, when viewed along the axial direction, the slot hole 211 is generally the form of rectangular shape, and the boss portion 244 is the form of trapezoidal shape with a less circumferential size as it is closer to the radially inner side, therefore, gaps with a larger circumferential size as it is closer to the radially inner side are formed between the edges on both circumferential sides of the rectangle and the waists on both circumferential sides of the trapezoid).

In addition, as shown in FIGS. 2, 3, 4, and 6, the stator assembly 20 also has an outer ring 25 and an inner ring 26, the outer ring 25 and inner ring 26 are in the form of a circular shape centered on the rotation axis L, respectively; the inner ring 26 has an outer diameter smaller than the inner diameter of the outer ring 25 and is located on the radially inner side of the outer ring 25, and the spindle 12 passes through the inner ring 26 in the axial direction. The circuit substrate 21 closes an opening of the cylindrical space formed between the outer ring 25 and the inner ring 26 at the one side L1 in the axial direction, therefore, the outer ring 25, the inner ring 26, and the circuit substrate 21 form an accommodating groove for accommodating the segmented iron cores 22, the coils 23, and the holding seats 24. The accommodating groove is filled with a packaging material 27 (such as epoxy resin) that solidly connects the segmented iron cores 22, the coils 23, the holding seats 24, the outer ring 25 and the inner ring 26. Moreover, the outer ring 25 is provided with through holes 251 that pass through axially, and there are the plurality of through holes 251 arranged in the circumferential direction. Moreover, most of the outer peripheral surface of the main body 21A of the circuit substrate 21 abuts with the inner peripheral surface of the outer ring 25, the inner peripheral surface of the through hole 212 of the main body 21A of the circuit substrate 21 abuts with the outer peripheral surface of the inner ring 26, and the protrusion 21B of the circuit substrate 21 protrudes towards radially outer side from the outer ring 25 through a recessed groove provided on the outer ring 25 at the one side L1 of in the axial direction.

(Structure of the Cover Body)

As shown in FIGS. 1 and 2, the cover body 90 includes a first cover body 90A and a second cover body 90B, the first cover body 90A abuts with and covers the stator assembly 20 from the one side L1 in the axial direction, and the second cover body 90B abuts with and covers the stator assembly 20 from the other side L2 in the axial direction.

Here, as shown in FIGS. 1 and 2, the first cover body 90A has a plate-shaped portion 91A and a peripheral wall portion 92A. The plate-shaped portion 91A extends radially and has a bore for the insertion of the first bearing 30A. The peripheral wall portion 92A extends from the peripheral edge of the plate-shaped portion 91A towards the other side L2 in the axial direction and abuts with the end face of the outer ring 25 of the stator assembly 20 at one side L1 in the axial direction, thereby forming a space between the first cover body 90A and the stator assembly 20 for accommodating the first rotor 11A. Moreover, the second cover body 90B has a plate-shaped portion 91B and a peripheral wall portion 92B. The plate-shaped portion 91B extends radially and has a bore for the insertion of the second bearing 30B. The peripheral wall portion 92B extends from the peripheral edge of the plate-shaped portion 91B towards one side L1 in the axial direction and abuts with the end face of the outer ring 25 of the stator assembly 20 on the other side L2 in the axial direction, thereby forming a space between the second cover body 90B and the stator assembly 20 for storing the second rotor 11B. Moreover, the peripheral wall portion 92A of the first cover body 90A has through holes 921A that pass axially. There are the plurality of through holes 921A arranged in the circumferential direction in a manner that correspond to the through holes 251 of the outer ring 25 of the stator assembly 20. The peripheral wall portion 92B of the second cover body 90B has through holes 921B that pass axially. There are the plurality of through holes 921B arranged in the circumferential direction in a manner that correspond to the through holes 251 of the outer ring 25 of the stator assembly 20.

In addition, as shown in FIG. 2, the first cover body 90A, the stator assembly 20, and the second cover body 90B are fixed together by using bolts 80. Specifically, there are a plurality of bolts 80 arranged in the circumferential direction, and these bolts 80 are screwed into the through holes 921A of the peripheral wall portion 92A of the first cover body 90A, the through holes 251 of the outer ring 25 of the stator assembly 20, and the through holes 921B of the peripheral wall portion 92B of the second cover body 90B from the one side L1 in the axial direction respectively, to fix the first cover body 90A, the stator assembly 20, and the second cover body 90B together.

Main Effect of the Embodiment

The axial flux motor 1 according to the present invention has the plurality of holding seats 24 corresponding respectively to the plurality of segmented iron cores 22, a holding seat 24 abuts with and covers the segmented iron cores 22 from both axial sides and the circumferential direction, and is used for winding a coil 23, the circuit substrate 21 has the slot holes 211, a slot hole 211 is used for embedding and positioning the portion of a holding seat 24 that protrudes more towards the one side L1 in the axial direction than the coil 23, and thereby, even if an axial size of the segmented iron core 22 is less than an axial size of the coil 23, it can also conveniently position the segmented iron cores 22 relative to the circuit substrate 21 by means of the holding seats 24, so as to restrain the deviation of the motor performance and the cogging torque and improve the productivity; moreover, the holding seats 24 are made of the insulating material, so it can easily ensure that the segmented iron cores 22 and coils 23 are insulated from each other, improving the productivity.

The above provides an exemplary description of the present invention in conjunction with the figures, however obviously, the specific implementation of the present invention is not limited by the aforementioned embodiments.

For example, in the above embodiment, the peripheral edge of the slot hole 211 on the circuit substrate 21 abuts with the holding seat 24 from the one side L1 in the axial direction so that the holding seat 24 is positioned relative to the circuit substrate 21 in the axial direction, but it is not limited to this, a fixture can also be used to position the circuit substrate 21 and the holding seat 24 in the axial direction, and in this condition, a packaging material 27 is used to fix the circuit substrate 21 and the holding seats 24 together.

In addition, in the above embodiment, when viewed along the axial direction, the segmented iron core 22 has an appropriate trapezoidal shape with a less circumferential width as it is closer to the radial inner side, but it is not limited to this, when viewed along the axial direction, the segmented iron core 22 can be formed into other shapes such as rectangle, and then, the accommodating chamber CB of the holding seat 24 is formed into a corresponding shape.

In addition, in the above embodiment, the holding seat 24 has the accommodating chamber CB, which is used for inserting the segmented iron core 22 from the radially outer side to the radially inner side, but it is not limited to this, the accommodating chamber CB can also be formed to allow the insertion of the segmented iron core 22 in the circumferential direction.

In addition, in the above embodiment, the holding seat 24 has the abutting portion AB that abuts with the segmented iron core 22 from the radially inner side, but it is not limited to this, a fixture can be used for positioning the segmented iron core 22 relative to the holding seat 24 in the radial direction.

In addition, in the above embodiment, the holding seat 24 has an elastic snap-fit SF that abuts with the segmented iron core 22 from the radially outer side, but it is not limited to this, the elastic snap-fit SF can be omitted.

In addition, in the above embodiment, the bottom plate 241 of the holding seat 24 generally covers the entire segmented iron core 22 from the one side L1 in the axial direction, and the top plate 242 of the holding seat 24 generally covers the entire segmented iron core 22 from the other side L2 in the axial direction, but it is not limited to this, when viewed along the axial direction, the sizes of the bottom plate 241 and top plate 242 of the holding seat 24 can be smaller than the size of the segmented iron core 22.

In addition, in the above embodiment, the holding seat 24 has the boss portion 244 that protrudes from the bottom plate 241 and is embedded into the slot hole 211 of the circuit substrate 21, but it is not limited to this, the boss portion 244 can be omitted and make the bottom plate 241 to be embedded into the slot hole 211.

In addition, in the above embodiment, the side plates 243 of the holding seat 24 only cover the portions of the side surface on both the circumferential sides of the segmented iron core 22, but it is not limited to this, the side plates 243 of the holding seat 24 can be formed to cover the entire side surfaces on both the circumferential sides of the segmented iron core 22, and alternatively, the side plate 243 of the holding seat 24 can be formed to cover a portion of or the whole of a side surface on one circumferential side of the segmented iron core 22.

In addition, in the above embodiment, the inner wall surface of slot hole 211 on the circuit substrate 21 is provided with a first engaging portion EP1 and a second engaging portion EP2 that are radially opposite to each other, but it is not limited to this, the first engaging portion EP1 and the second engaging portion EP2 can be formed to be opposite to each other in a direction other than the radial direction, and the first engaging portion EP1 and the second engaging portion EP2 are not limited to the shape shown in the figures, but can be appropriately modified as necessary.

In addition, in the above embodiment, there are the gaps formed between the portion of the holding seat 24 embedded into the slot hole 211 and the inner wall surface of the slot hole 211 of the circuit substrate 21 in the circumferential direction, but it is not limited to this, the gaps can be omitted.

In addition, in the above embodiment, the rotor 11 includes the first rotor 11A and the second rotor 11B, but it is not limited to this, either one of the first rotor 11A and the second rotor 11B can be omitted.

In addition, in the above embodiment, the first detection element 213 is composed of a magnetic sensing element, but it is not limited to this, it can be composed of an optical element or an inductive element.

In addition, in the above embodiment, the first detection element 213 and the second detection element 214 are also provided on the circuit substrate 21, but it is not limited to this, the first detection element 213 and the second detection element 214 can be omitted.

In addition, in the above embodiments, the first connector 215 and the second connector 216 are also provided on the circuit substrate 21, but it is not limited to this, the first connector 215 and the second connector 216 can be omitted.

It should be understood that, within the scope of the present invention, it can freely combine various parts in the embodiments, or appropriately deform or omit various parts in the embodiments.

What is claimed is:

1. An axial flux motor, comprising:
a rotor assembly and a stator assembly,
the rotor assembly has a magnet, the stator assembly has a circuit substrate, segmented iron cores, and coils, the circuit substrate extends radially, the segmented iron cores are supported on the circuit substrate in a manner to be opposite to the magnet in an axial direction, and there are a plurality of the segmented iron cores arranged in a circumferential direction, a coil is sleeved on a segmented iron core, wherein
there are a plurality of holding seats made of an insulating material corresponding respectively to the plurality of segmented iron cores, a holding seat abuts with and covers the segmented iron core from both axial sides and the circumferential direction, and is used for winding the coil,
the circuit substrate has slot holes, a slot hole is used for embedding and positioning a portion of the holding seat that protrudes more towards one axial side than the coil, wherein:
the holding seat has an accommodating chamber, which is used for insertion of the segmented iron core from a radially outer side to a radially inner side.

2. The axial flux motor according to claim 1, wherein:
a peripheral edge of the slot hole abuts with the holding seat from one side in the axial direction, and
an inner wall surface of the slot hole abuts with the holding seat in the radial and circumferential directions, respectively.

3. The axial flux motor according to claim 1, wherein:
the holding seat has an abutting portion that abuts with the segmented iron core from the radially inner side.

4. The axial flux motor according to claim 3, wherein:
the holding seat has an elastic snap-fit that abuts with the segmented iron core from the radially outer side.

5. The axial flux motor according to claim 4, wherein:
the holding seat has a bottom plate, a top plate, and side plates that surround to form the accommodating chamber,
the bottom plate abuts with and covers the segmented iron core from the one side in the axial direction, and abuts with the circuit substrate from the other side in the axial direction,
the top plate abuts and covers the segmented iron core from the other side in the axial direction,
the side plates connect the top plate with the bottom plate, and abut with the segmented iron core from both sides in the circumferential direction.

6. The axial flux motor according to claim 5, wherein:
the top plate and/or the bottom plate is provided with an abutting portion that abuts with the segmented iron core from the radially inner side.

7. The axial flux motor according to claim 5, wherein:
the holding seat has a boss portion that protrudes from the bottom plate and is embedded into the slot hole,
a portion of the bottom plate connected to the boss portion abuts with the peripheral edge of the slot hole from the other side in the axial direction.

8. The axial flux motor according to claim 1, wherein:
the inner wall surface of the slot hole is provided with a first engaging portion and a second engaging portion opposite to the first engaging portion in a first direction,
the portion of the holding seat embedded into the slot hole has a first engaged portion that engages with the first engaging portion and a second engaged portion that engages with the second engaging portion.

9. The axial flux motor according to claim 8, wherein:
a gap is formed between the portion of the holding seat embedded into the slot hole and the inner wall surface of the slot hole in a second direction perpendicular to the first direction.

\* \* \* \* \*